United States Patent [19]

Martenson

[11] 4,328,783
[45] May 11, 1982

[54] PORTABLE PAPER BURNING COOKSTOVE

[76] Inventor: Donald S. Martenson, 24430 S. Highway 99E, Canby, Oreg. 97013

[21] Appl. No.: 155,421

[22] Filed: Jun. 2, 1980

[51] Int. Cl.³ .............................................. F24B 3/00
[52] U.S. Cl. ................................................. 126/25 R
[58] Field of Search .................. 126/25 R, 25 A, 9 R

[56] References Cited

U.S. PATENT DOCUMENTS

| | | | |
|---|---|---|---|
| 2,474,043 | 6/1949 | Etches | 126/9 R |
| 3,060,918 | 10/1962 | Meyer | 126/9 |
| 3,538,905 | 11/1970 | Reichenbach | 126/25 |
| 3,552,302 | 1/1971 | Gilberg | 99/444 |
| 3,610,225 | 10/1971 | Schwantes | 126/25 R |
| 4,140,099 | 2/1979 | Newport | 126/9 |
| 4,149,514 | 4/1979 | Latouf | 126/9 |

OTHER PUBLICATIONS

Label for "Griddle'n Grill," Model AG105, Trend Products Co., North Hollywood, California 91607, shows square griddle with handle.

*Primary Examiner*—Carroll B. Dority, Jr.
*Attorney, Agent, or Firm*—Klarquist, Sparkman, Campbell, Leigh, Whinston & Dellett

[57] ABSTRACT

A portable cookstove incorporates an improved ventilation systems, including baffle members at front and rear openings, so that sufficient cooking heat can be generated from burning layered sheets of paper. A hole in the cooking surface provides drainage of excessive food grease into the fire to supplement fueling. A double-walled bottom of the stove aids dissipation of waste heat.

14 Claims, 4 Drawing Figures

PORTABLE PAPER BURNING COOKSTOVE

BACKGROUND OF THE INVENTION

The present invention relates to a portable cookstove. More particularly, the present invention relates to a portable cookstove that has the capability of efficiently burning layered sheets of paper as a source of fuel to provide sufficient cooking heat.

Prior art reveals different models of portable cookstoves. Typically, the lightweight heat-resistant components of the cookstove fold into a compact package for easy storage and transport. Various types of fuels such as wood, charcoal, paper or the like are burned inside the cookstove to provide cooking heat. Primarily due to the portable design, poor air ventilation within the cookstove causes the fuel to burn inefficiently. As a result, paper, for example, must be crumpled before it can be burned efficiently; layered sheets of paper either will not burn or will not burn efficiently enough to provide sufficient cooking heat. Crumpled paper has the disadvantages of taking up too much space and burning too fast, thereby requiring constant feeding of the fire.

Although various types of fuel can be utilized with the stove of the present invention, it is particularly useful for burning layered sheets of paper efficiently and effectively to provide sufficient cooking heat over a prolonged period of time. Better air ventilation and a convective-conductive cooling system for dissipation of waste heat and insulation are two additional significant improvements over the prior art portable cookstove.

OBJECTS AND SUMMARY OF THE INVENTION

The primary object of the present invention is to provide a portable cookstove with improved air ventilation features to enhance the burning process of various fuels.

Another object of the present invention is to provide a portable cookstove which is particularly useful to burn layered sheets of paper effectively and efficiently.

Another object of the present invention is to provide a portable cookstove that has an easily detachable cooking surface.

Still another object of the present invention is to provide a portable cookstove which is designed to drain excessive cooking grease from the cooking surface and into the fuel box to burn as a supplemental fuel.

A further object of the present invention is to provide a portable cookstove that incorporates a convective-conductive cooling system for dissipation of waste heat and insulation.

Other objects of the present invention are to provide a portable cookstove which is of simplified design, which is simple to manufacture and which is made from inexpensive heat-resistant and -conductive material such as sheet metal.

In accordance with the objects of the present invention, a portable cookstove comprises a box-like structure having a lower front opening, an upper rear opening, a flat cooking surface and a double-walled floor defining a fuel box above the upper floor and a cooling air duct between the two floors. The lower front opening, defined by two baffles near the front of the cookstove and two sidewalls, provides an inlet where air and fuel are introduced into a fuel box. The upper rear opening, defined by two sidewalls, the cooking surface and a long rear baffle located at the rear of the fuel box, acts as a flue for smoke and exhaust gases. The rear baffle, however, directs the hot products of combustion toward the cooking surface before they are exhausted. The arrangement of the lower front opening and the upper rear opening provides improved air flow and ventilation for effective and efficient burning of the fuel. As the heat generated by the burning fuel begins to cook the food on the cooking surface, excessive grease seeping from the food is drained from the cooking surface by a centrally located drain hole therethrough leading into the fuel box. As the grease drips into the fire, it burns as a supplemental fuel. The primary fuel, such as sheets of paper, is burned on the upper floor inside the fuel box. The lower floor acts as a stand for the cookstove as well as an integral part of a convective-conductive cooling system for waste heat dissipation and insulation.

The foregoing and other objects, features and advantages of the present invention will become more apparent from the following detailed description, which proceeds with reference to the accompanying drawing.

DESCRIPTION OF THE PREFERRED EMBODIMENT

Figure 1:
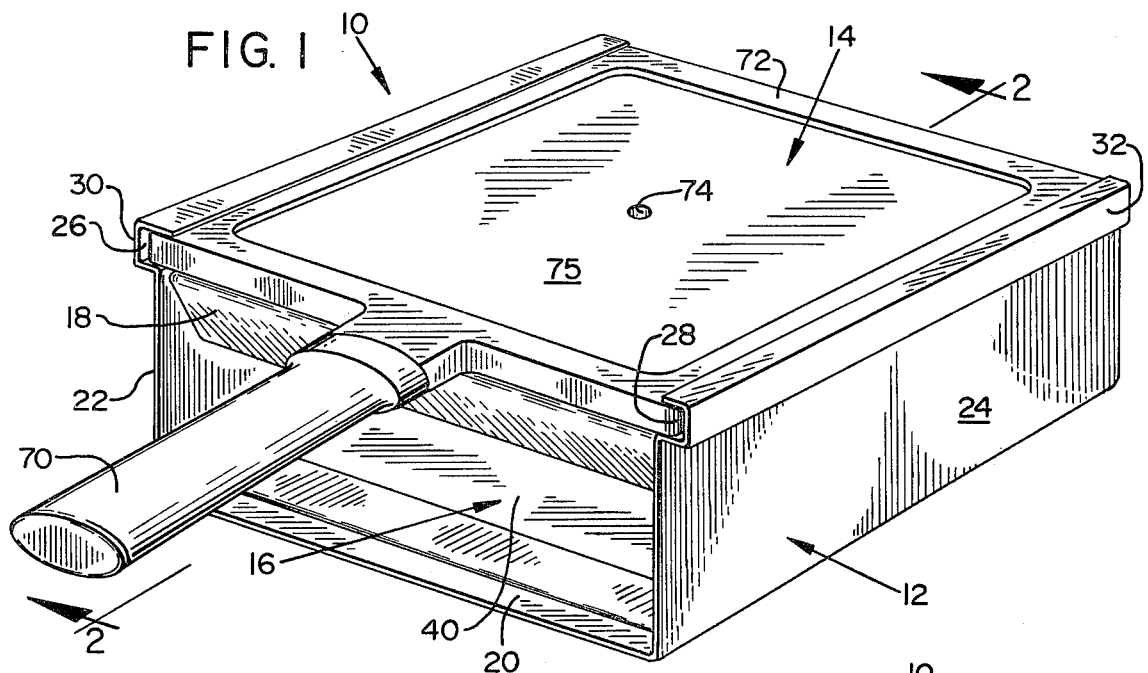
FIG. 1 is a perspective view of a portable paper-burning cookstove of the present invention.

As generally shown in FIG. 1, a portable paper-burning cookstove 10 comprises a U-shaped base assembly 12, a frying pan or cooking plate 14, a nesting assembly 16 and an upper front baffle 18. The U-shaped base assembly 12 comprises a base floor member 20 transversely connecting two spaced-apart, opposed sidewalls 22 and 24. The frying pan 14 slides into two channel-shaped receiving means 26,28 located along upper edge portions 30,32 of sidewalls 22,24, and encloses the U-shaped base assembly 12 to define a front opening 34 and a rear opening 36 (shown in FIGS. 2 and 4). The upper baffle 18 and a forward portion 38 of nesting assembly 16 are arranged within the U-shaped base assembly 12 to define an air-fuel inlet 40. A rearward portion 42 of nesting assembly 16 and a lower rear surface 44 of frying pan 14 are arranged within the U-shaped base assembly 12 to define an upper rear exhaust outlet 46, shown in FIGS. 2 and 4. The nesting assembly 16 and base floor 20, both of which are attached to sidewalls 22, 24, define a slot-shaped cooling conduit or duct 48, as best shown in FIGS. 2, 3 and 4.

Figure 2:
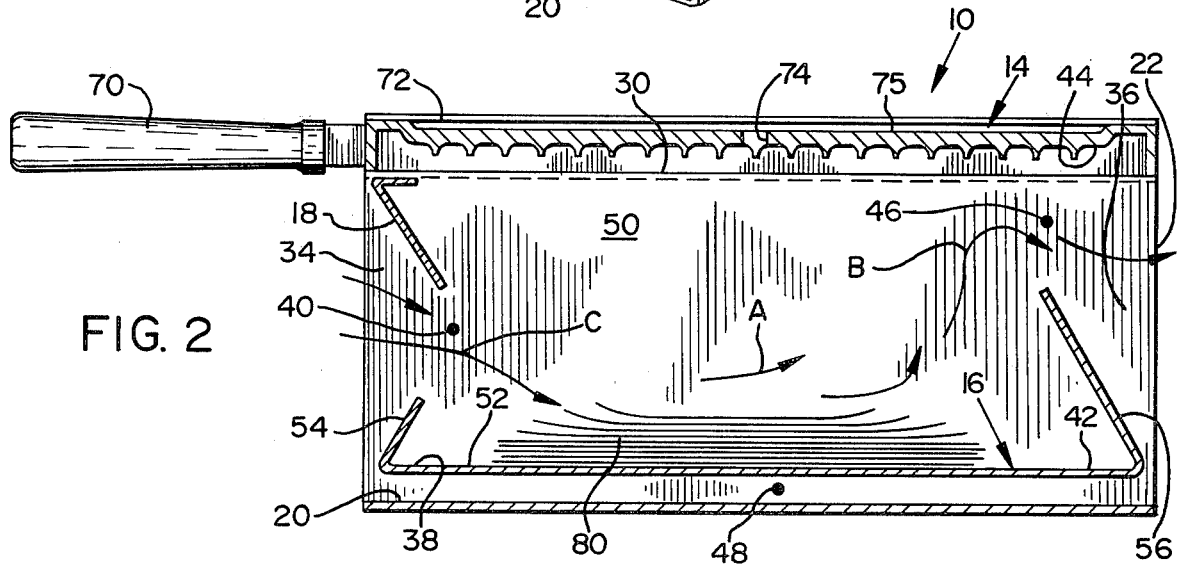
FIG. 2 is a cross-sectional view of the paper-burning cookstove taken along line 2—2 of FIG. 1.

The nesting assembly 16, shown best in FIG. 2, is a unitary structure made from a heat-resistant material such as sheet metal. It extends transversely across and longitudinally through the U-shaped base assembly 12, includes a fuel supporting upper floor member 52, a low front baffle 54, and high rear baffle 56. The nesting assembly 16 is bent upwardly and rearwardly at the forward portion 38 to form the low inwardly inclined baffle 54 near the forward opening 34 of base assembly 12. Nesting assembly 16 is also bent upwardly and forwardly at its rear end to form the high rear baffle 56 near rear opening 36. As shown in FIGS. 3 and 4, the nesting assembly 16 is attached, as by welding, at its lateral edges 58 and 60 to two corresponding inner surfaces 62 and 64 of the respective sidewalls 22,24, and is spaced a short distance above the base floor 20 to define the low, wide cooling duct 48.

Figures 3, 4:
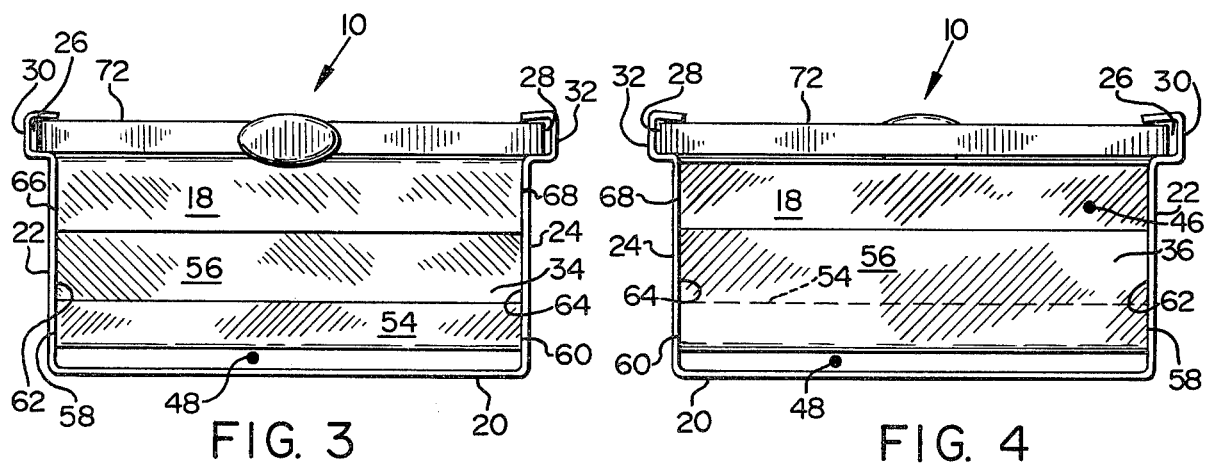
FIG. 3 is a front elevational view of the portable paper-burning cookstove as shown in FIG. 1.
FIG. 4 is a rear elevational view of the portable paper-burning cookstove as shown in FIG. 1.

The longer upper front baffle 18 extends transversely between the upper portions 30 and 32 of the sidewalls 22 and 24 near the forward opening 34 and is rigidly attached to its opposite ends 66 and 68 to the corresponding inner surfaces 62,64, as shown in FIG. 3. Baffle 18 extends angularly downwardly and inwardly of the fuel compartment 50. Upper baffle 18 and the short lower baffle 54 define the air-fuel inlet 40, shown in FIG. 2. In general, the air-fuel inlet is positioned lower than the exhaust outlet to provide a natural draft through the compartment 50.

The frying pan 14 has a handle 70 connected to a flat cooking plate 72 having a centrally located drain hole 74 extending therethrough to drain excess grease from a cooking surface 75 into the fuel burning compartment 50. The upper portions 30 and 32 of the respective sidewalls 22,24 are formed to define two slideways or channels 26 and 28 for slidable insertion of two corresponding longitudinal edges 76 and 78 of the frying pan 14 into the U-shaped base assembly 12, as best shown in FIGS. 1, 3 and 4. If desired, frying pan 14 can comprise a commercially available utensil, but modified by boring drainhole 74 therethrough.

When the frying pan 14 is within channels 26,28, as shown in FIGS. 1 and 2, the long rear baffle 56 in combination with the lower rearward surface 44 of frying pan 14 define the upper exhaust outlet 46. The frying pan thus positioned also helps rigidify the upper portion of the stove assembly.

With the exception of the frying pan or skillet 14, the stove assembly is preferably made entirely of sheet metal, in three pieces. Base assembly 12 is formed into a U-shape by bending a flat piece of sheet metal stock upwardly at its opposite sides to form bottom wall 20 and opposite sidewalls 22,24. The upper edges of the opposite sidewalls are then formed by bending into the channel-shaped slideways 26,28.

As apparent from FIG. 2, nesting assembly 16 is also formed from a single flat piece of sheet metal stock sized to fit snugly within opposite sidewalls 22,24 of the base assembly. Low front baffle 54 and high rear baffle 56 are bent to size and shape from the front and rear end portions of floor member 52. Thereafter the nesting assembly may be welded in place within the base assembly.

Upper front baffle 18 is formed from an appropriate sized third piece of sheet metal and welded at its opposite ends into position against inner sidewalls 22,24, to complete the stove fabrication.

OPERATION

To operate the portable paper-burning cookstove 10, any fuel such as charcoal, wood, paper 80 (shown in FIG. 2) or the like is introduced into the fuel burning compartment 50 through the lower air-fuel inlet 40 and is placed on the fuel-supporting floor 52. The fuel is then ignited to initiate burning as illustrated at A in FIG. 2. As the fuel burns, the hot products of combustion, such as smoke and exhaust gases, rise. As illustrated by arrows B in FIG. 2, such hot gases and smoke naturally tend to exit through upper exhaust outlet 46 because of its relatively higher position than lower air-fuel inlet 40. However, before doing so, the hot smoke and gases are deflected by rear baffle 56 inwardly of the fuel box toward the cooking surface to heat the same. As the exhaust products (arrows B) exit upper exhaust outlet 46, fresh air, illustrated by arrows C in FIG. 2, required to sustain the burning process, is drawn into the fuel burning compartment 50 through air-fuel inlet 40.

A distinct advantage of this ventilation system for a portable cookstove is that a stack of layered flat sheets of paper 80, as shown in FIG. 2, can be introduced into the fuel burning compartment 50 as a fuel and burned effectively and efficiently to provide sufficient and sustained heat for cooking. The ventilation system, and especially angular baffle 18, causes fresh air (arrows C) to be drawn into the fuel burning compartment 50 and downwardly toward floor 52 at a particular velocity. From observation, it is theorized that efficient burning is promoted according to Bernoulli's law of fluid flow, in the following manner: As the velocity of a fluid such as air flowing across a surface increases, the static surface pressure decreases. Thus, air flowing over the upper surface of the uppermost sheet of the stack of paper sheets 80 reduces the surface pressure on the uppermost sheet, causing a suction which, in turn, lifts the uppermost sheet. This enables air to flow under as well as over the lifted sheet, promoting combustion. As the upper sheet burns, it exposes the next uppermost sheet of the stack to air flow through the fire box so that the burning process is repeated with the next sheet. As a result, sheets from stack 80 are burned more or less one at a time, providing even heat and prolonged burning. The ventilation system and burning process also induce layered sheets 80 to burn effectively and efficiently in sequence, from the top of the stack down.

Seeping grease (not shown) emitted from cooking foods is drained into the fire as a supplemental fuel. Once grease accumulates in sufficient quantity, it will drain from the frying pan 14, shown in FIGS. 1 and 2, through central drainhole 74 positioned above fuel burning compartment 50. The grease will drip into the fire and, due to its flammable nature, will burn along with the other fuel. This feature also prevents foods from becoming overly greasy during cooking.

After the food is cooked, the frying pan 14, as shown in FIG. 1, is easily removed from the U-shaped base assembly 12 by grasping the handle 70 and sliding the flat plate 72 from the receiving channels 26 and 28. As a result, frying pan 14 can also be utilized as a hot serving plate. Also, once detached, frying pan 14 can be easily cleaned apart from the U-shaped base assembly 12. The handle of the frying pan can also be used to transport the entire cookstove assembly from one location to another.

When the cookstove reaches cooking temperature, it is desirable to dissipate any heat that is not directed to the cooking surface 75 to prevent burning out floor 52. Heat dissipation is promoted by base floor 20, as best shown in FIG. 2, which also provides the support base for cookstove 10. According to heat transfer theory, heat generated by burning fuel will flow by conduction from surfaces of higher temperature toward surfaces of lower temperature. The fuel supporting floor 52 and the base floor 20, as shown in FIG. 2, comprise a double-walled bottom for the portable cookstove 10. Heat will dissipate as it flows from the fuel supporting floor 52 to the sidewalls 22 and 24 and, subsequently, to base floor 20. Hot surfaces of fuel supporting floor 52 and base floor 20 will cause the temperature of the air within the slot-shaped cooling duct 48 to rise. The warmer air inside the slot-shaped cooling duct 48 is naturally replaced by cooler air from outside the cookstove 10. Thus, natural convective air flow occurs through duct 48 to further heat dissipation. Moreover, the arrangement of the double-walled bottom of the present invention insulates the base floor 20 from heat caused by fuel burning on the fuel supporting floor 52. As a result of the convective-conductive cooling system, the portable cookstove can be used on table tops or other surfaces without burning them.

A preferred embodiment of the present invention and its significant advantages and advancements over prior art have been described with a degree of specificity. It should be understood, however, that the specificity of description has been made by way of example only and that the scope of the invention should be limited only by the true spirit and scope of the appended claims.

I claim:

1. A portable cookstove apparatus, comprising:
    a base assembly including a first floor member and a pair of opposed sidewalls extending upwardly from opposite side edge portions of said floor member,
    the upper edge portions of said opposed sidewalls defining cooking surface-receiving means for removable retention of a substantially flat cooking member,
    a second floor member extending between said opposed sidewalls and suspended therefrom above and in spaced relationship to said first floor member, such that said first and second floor members define the upper and lower limits of a cooling duct open at opposite ends beneath said second floor, and such that said opposed sidewalls above said second floor member and said second floor member define a fuel-burning compartment, and a cooking plate removably insertable into said receiving means to define a top wall of said fuel-burning compartment and said cooking surface.

2. Apparatus according to claim 1 wherein said plate includes a drain hole therethrough opening into said fuel-burning compartment for draining excess cooking grease into said compartment for use as a supplemental fuel.

3. Apparatus according to claim 1 wherein said second floor member and opposed sidewalls define a front opening leading into said fuel-burning compartment and a rear opening leading out of said compartment, said apparatus including a first baffle member extending across an upper portion of said front opening between said opposed sidewalls and extending downwardly toward but terminating above said second floor member to provide a fuel-air inlet, and a second baffle member extending across said rear opening between said opposed sidewalls and extending upwardly from a rear portion of said second floor member to provide an exhaust outlet.

4. Apparatus according to claim 3 wherein said baffle members are sized such that said exhaust outlet is positioned at a level above said fuel-air inlet.

5. Apparatus according to claim 3 wherein said first baffle member extends angularly downwardly and inwardly of said fuel-burning compartment to direct inlet air toward said second floor, and said second baffle member extends angularly upwardly and inwardly of said compartment to direct hot exhaust products of combustion toward said cooking member.

6. Apparatus according to claim 3 including a third baffle member extending across said front opening between said opposed sidewalls and extending upwardly from a forward portion of said second floor member, said third baffle member terminating at a level below said second baffle member, with reference to said second floor member.

7. Apparatus according to claim 1 wherein said receiving means comprises slideways for slidably receiving a cooking plate member.

8. Apparatus according to claim 7 wherein said slideways comprise channel-shaped slideways opening inwardly toward one another and extending the length of said sidewalls.

9. Apparatus according to claim 6 wherein said first floor member, opposed sidewalls and receiving means are formed from a first single piece of sheet metal, and said second floor member and second and third baffle members are formed from a second single piece of sheet metal.

10. A portable cookstove apparatus adapted to burn layered sheets of paper, comprising:
    a base assembly including a floor member and a pair of opposed sidewalls extending upwardly from opposite side edge portions of said floor member,
    a substantially flat cooking plate member removably supported on upper edge portions of said opposed sidewalls, such that said floor member, opposed sidewalls and cooking plate define a fuel-burning compartment having front and rear openings,
    a first baffle member extending across an upper portion of said front opening between said opposed sidewalls and angularly downwardly and inwardly of said compartment toward said floor member and terminating above said floor member to define a fuel-air inlet which directs inlet air toward said floor member,
    a second baffle member extending across said rear opening between opposed sidewalls and angularly upwardly and inwardly of said compartment from a rear portion of said floor member and terminating below said plate member to define an exhaust outlet from said compartment, said second baffle member acting to direct hot products of combustion upwardly and inwardly against said cooking plate before they pass through said exhaust outlet.

11. Apparatus according to claim 10 including a third baffle member of lesser vertical dimension than said first and second baffle members, said third baffle member extending upwardly from a front portion of said floor member in opposition to said first baffle member.

12. Apparatus according to claim 10 wherein said inlet is positioned at a level generally below the level of said outlet relative to said floor member.

13. Apparatus according to claim 10 wherein said floor member is positioned at a level above the lower extremities of said opposed sidewalls.

14. Apparatus according to claim 10 including a second floor member spaced below said first-mentioned floor member and defining with lower extensions of said opposed side-walls a cooling air duct extending from front to back of said stove and open at its opposite ends.

* * * * *